United States Patent [19]

Grover

[11] Patent Number: 5,582,454
[45] Date of Patent: Dec. 10, 1996

[54] SPRING-BIASED LATCHING PIN FOR A CONVERTIBLE TOP

[75] Inventor: Brian E. Grover, Warren, Mich.

[73] Assignee: Mascotech Automotive Systems Group, Inc., Auburn Hills, Mich.

[21] Appl. No.: 324,286

[22] Filed: Oct. 14, 1994

[51] Int. Cl.[6] .................................. B60J 7/185
[52] U.S. Cl. .......................... 296/107; 296/136
[58] Field of Search .................. 296/136, 124, 296/116, 107; 292/DIG. 5

[56] References Cited

U.S. PATENT DOCUMENTS

| 2,747,928 | 5/1956 | Olivier et al. | |
|---|---|---|---|
| 3,216,763 | 11/1965 | Heincelman. | |
| 3,338,624 | 8/1967 | Champion. | |
| 3,712,665 | 6/1975 | Klein. | |
| 3,891,252 | 6/1975 | Lehmann. | |
| 3,994,524 | 11/1976 | Lehmann. | |
| 4,553,784 | 11/1985 | Trenkler. | |
| 4,664,436 | 5/1987 | Eyb. | |
| 4,746,163 | 5/1988 | Muscat | 296/107 X |
| 4,778,215 | 10/1988 | Ramaciotti. | |
| 4,801,173 | 1/1989 | Trenkler. | |
| 4,948,194 | 8/1990 | Dogliani. | |
| 5,106,145 | 4/1992 | Corder. | |
| 5,267,769 | 12/1993 | Bonné et al. | 296/136 X |

*Primary Examiner*—Joseph Pape
*Attorney, Agent, or Firm*—Edgar A. Zarins; Malcolm L. Sutherland

[57] ABSTRACT

A collapsible latching pin for the rear bow of a vehicle convertible top which facilitates latching of the top in the enclosing position while collapsing out of the way upon storage of the top within the boot well. The pin includes a spring to bias the pin downwardly to be latched by the closure mechanism of the top. As the top is stored within the vehicle, the rear bow will engage the bottom of the storage well collapsing the pin flush with the bottom increasing the storage room for the top. As the top is removed from the storage well the latching pin will be biased to the vertical latching position.

5 Claims, 1 Drawing Sheet

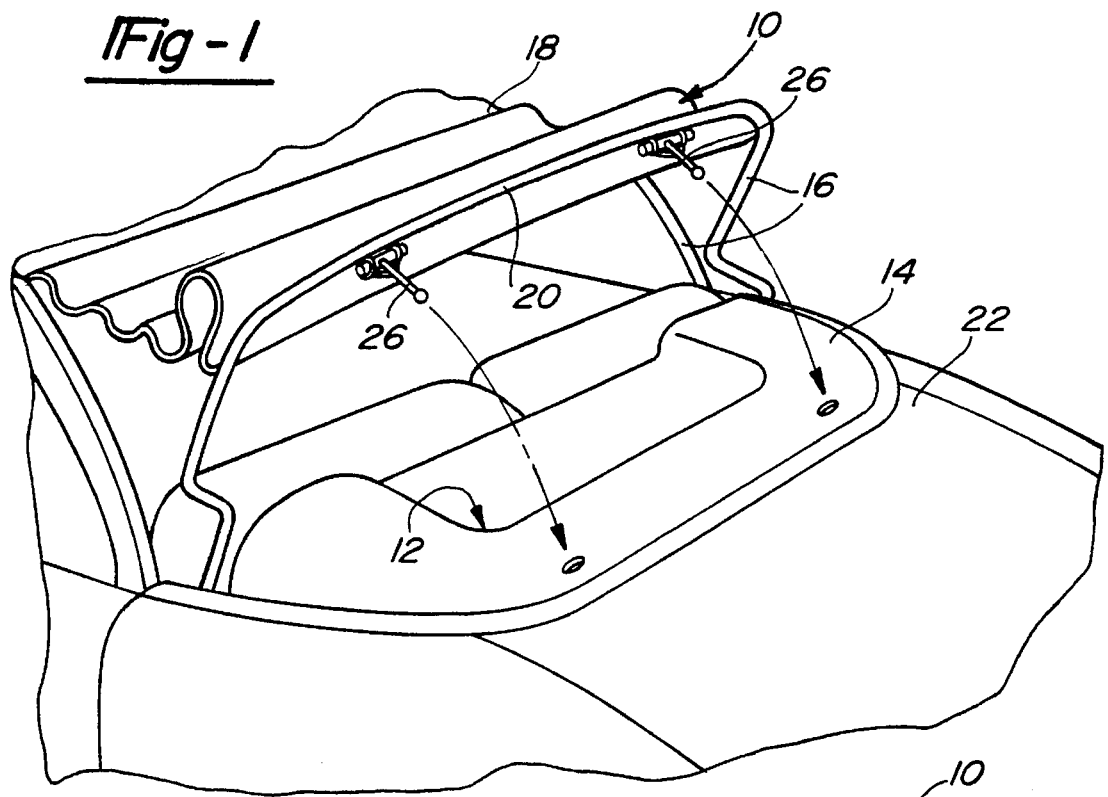
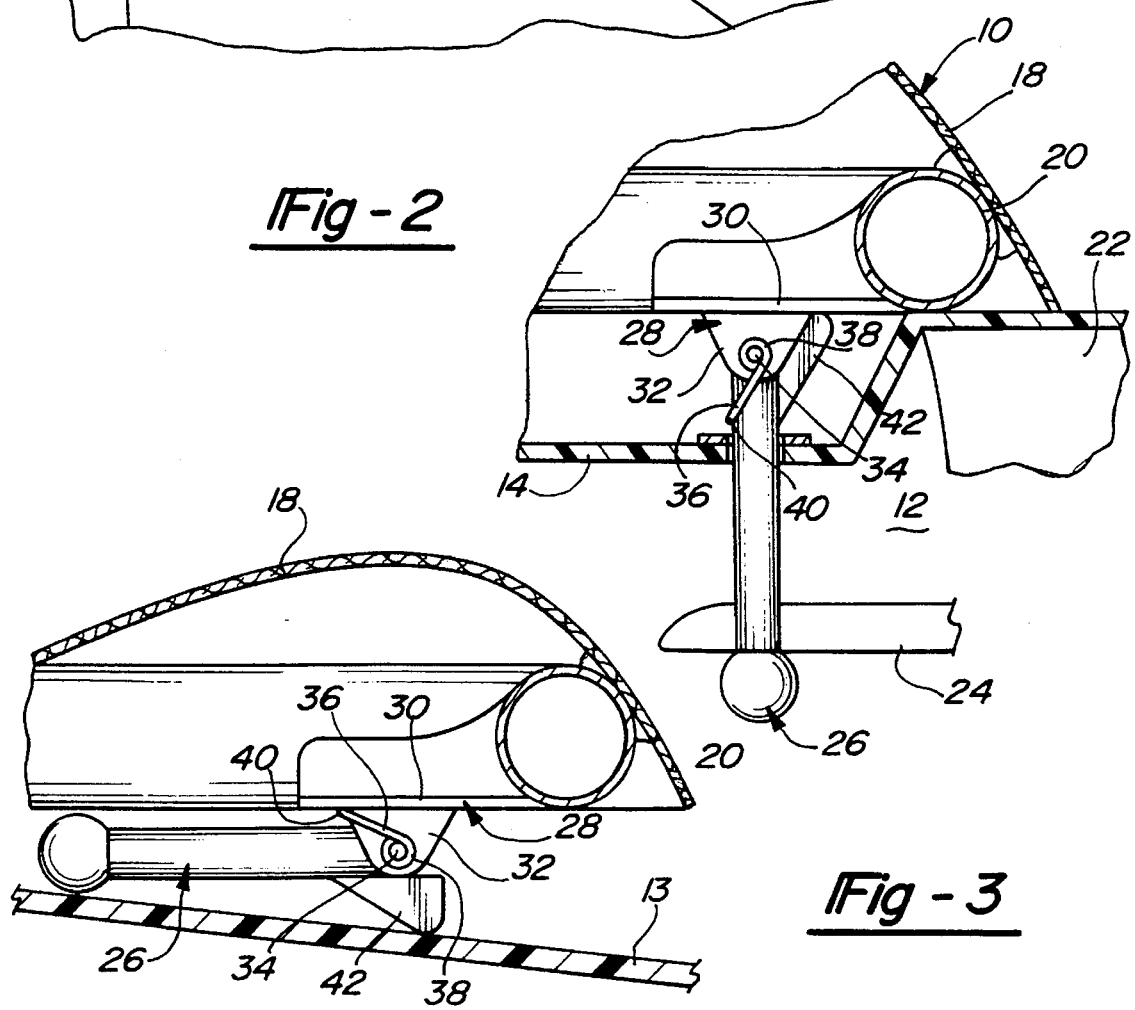

SPRING-BIASED LATCHING PIN FOR A CONVERTIBLE TOP

BACKGROUND OF THE INVENTION

I. Field of the Invention

This invention relates to a latching mechanism for a vehicle convertible top and, in particular, to a collapsible latching pin for the rear bow of a convertible top which facilitates the compact storage of the top within the rear well of the vehicle.

II. Description of the Prior Art

The typical convertible top is adapted to be secured to the front header and at the rear of the passenger compartment proximate the well for storing the folded top. A well cover or hard boot may be employed to enclose the well both with the top stored in the well or with the top extended to enclose the passenger compartment. During collapse and storage of the top, the rear bow of the convertible top must be raised to allow the hard boot cover to open. Once the cover is open the top is folded within the well. In order to latch and seal the rear bow of the top against the vehicle and hard cover, a latch pin extends downwardly from the rear bow which is lockingly engaged by an actuating mechanism. The mechanism grasps the latching pin and rear bow downwardly.

In the prior known convertible systems, the latching pin is rigid which poses a problem upon storage of the convertible top within the rear well. The rigid latching pin will engage the bottom of the well limiting the fold down depth of the top. In some prior vehicles, the depth of the well is simply increased which poses further space limitations within the vehicle. As an alternative, a slot may be formed in the bottom of the well into which the rigid latching pin is seated. Although less constraining than the extra well depth, the slot must be designed around within the vehicle.

SUMMARY OF THE PRESENT INVENTION

The present invention overcomes the disadvantages of the prior known vehicle convertible tops by providing a spring-biased latching pin which collapses upon storage of the folded top thereby reducing the depth of the storage well for the top.

The spring-biased latching pin of the present invention is collapsibly attached to a rear bow of a convertible top to facilitate sealing engagement of the rear of the top with the vehicle body. With the top in the raised position, the latching pin extends downwardly through the hard boot cover to be lockingly engaged by a latching mechanism. The latching mechanism preferably pulls on the latching pin to draw the rear bow downwardly against the vehicle body. Upon release of the latching pin, the rear bow may be raised and the top subsequently folded for storage within the rear well.

The latching point is pivotably attached to the rear bow through a mounting bracket. A spring coaxial with the pivot point of the pin biases the latching pin towards an extended vertical position. Nevertheless, the latching pin may be collapsed to a horizontal position as the pin engages stationary object. Accordingly, as the top is folded into the rear well of the vehicle, the latching pin will engage the floor of the well and pivot to the collapsed position decreasing the top stack space within the well. As the top is removed from the well, the spring will bias the latching pin to its extended position ready for engagement by the latching mechanism.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view of a vehicle convertible top embodying the spring-biased latching pin of the present invention;

FIG. 2 is an enlarged partial view of a latching pin in a deployed latching position; and FIG. 3 is an enlarged partial view of the latching pin in a folded stored position.

DETAILED DESCRIPTION OF THE PREFERRED EMBODIMENT OF THE PRESENT INVENTION

Referring to FIGS. 1 through 3, there is shown a partial section of a vehicle convertible top 10 which is selectively movable between an extended position enclosing the passenger compartment of the vehicle and a stored position exposing the passenger compartment of the vehicle. In the typical convertible vehicle configuration, a storage well 12 is provided rearward of the passenger compartment into which the top 10 is foldably stored. A hard boot cover 14 encloses the well 12 when the top 10 is both extended and stored to provide a rear deck. The convertible top incorporates a series of bows 16 to support the top material 18 including a rear bow 20 adapted to seal against the vehicle body 22 to prevent leakage into the passenger compartment.

The convertible top assemblies provide a latching mechanism 24 to sealingly secure the rear bow 20 against the vehicle 22. The latching mechanism 24 may be in the form of a camming plate or other structure which grasps a latching pin 26 attached to the rear bow 20. The latching mechanism 24 preferably draws the latching pin 26 downwardly in turn pulling the rear bow 20 into sealing engagement with the vehicle body 22. Upon release of the latching pin 26, the rear bow 20 may be raised to facilitate opening of the hard boot cover 14 and storage of the top 10 within the well 12.

The latching pin 26 is attached to the rear bow 20 through a mounting bracket 28. In a preferred embodiment, the bracket 28 includes a substantially horizontal plate 30 secured to the rear bow 20 and a pair of depending parallel flanges 32. The depending flanges 32 support a pivot rod 34 extending therebetween. The latching pin 26 is pivotably mounted to the pivot rod 34. A biasing spring 36 is also mounted to the pivot rod 34 to bias the latching pin 26 towards its deployed position as will be subsequently described. The spring 36 includes first ends 38 engaging the mount bracket 28 and second end 40 engaging the latching pin 26 so as to bias the pin 26 in a first direction. The latching pin 26 also includes a stop block 42 which limits the pivoting movement of the latching pin 26 by engaging the plate 30. As a result, the latching pin 26 will be biased towards the vertical position by the spring 36 (FIG. 2) but can collapse to a substantially horizontal position against the force of the spring 36 (FIG. 3).

The present invention reduces the top stack height by allowing collapse of the latching pin 26 as the top 10 is folded into the storage well 12 against a bottom wall 13. With the hard boot cover 14 open, the top 10 will fold rearwardly into the storage well 12. As the latching pin 26 engages the bottom 13 of the well 12 it will pivot against the force of the spring 36 to extend substantially parallel to the rear bow 20 thereby reducing the stack height of the stored top 10. As the top is removed from storage 12, the spring 26 will bias the latching pin 26 to the vertical position allowing it to be engaged by the latching mechanism 24 to secure the top 10.

The foregoing detailed description has been given for clearness only and no unnecessary limitations will be obvious to those skilled in the art without departing from the scope and spirit of the appended claims.

What is claimed is:

1. In a convertible top for a vehicle having a passenger compartment, the convertible top selectively movable between an extended passenger enclosing position and a collapsed position stored within a well of the vehicle, the vehicle including a latching mechanism selectively engageable with the convertible top and the connectable top including a rear bow selectively engageable with the vehicle, the improvement comprising:

a collapsible latching pin pivotably connected to the rear bow of the vehicle top, said latching pin having means for biasing said pin towards an extended position for engagement by the vehicle latching mechanism, said latching pin pivotably collapsing upon movement of the top to the stored position as said pin engages a wall of the storage well thereby reducing the collapsed height of the vehicle top, said latching pin biased to said extended position upon movement of the top out of the storage well.

2. The improvement as defined in claim 1 wherein said latching pin is pivotably attached to a bracket mounted to the rear bow of the top, said bracket including a pivot rod to which said latching pin is mounted.

3. The improvements as defined in claim 2 wherein said means for biasing said latching pin includes a spring mounted to said pivot rod of said bracket and biasingly engages said latching pin.

4. In a convertible top for a vehicle having a passenger compartment, the convertible top selectively movable between an extended passenger enclosing position and a collapsed position stored within a well of the vehicle, the vehicle including a latching mechanism selectively engageable with the convertible top and the convertible top including a rear bow selectively engageable with the vehicle, the improvement comprising:

a collapsible latching pin pivotably connected to the rear bow of the vehicle top, said latching pin including a spring biasing said pin towards an extended position for locking engagement by the vehicle latching mechanism to secure the top in the passenger enclosing position, said latching pin pivotably collapsing upon movement of the top to the stored position as said pin engages a bottom wall of the storage well thereby reducing the collapsed height of the stored vehicle top, said latching pin biased to said extended position by said spring upon movement of the top out of the storage well whereby said latching pin is selectively engageable by the latching mechanism.

5. The improvement as defined in claim 4 and further comprising a mounting bracket attached to the rear bow, said mounting bracket including a pivot pin, said latching pin and spring mounted to said pivot pin.

* * * * *